United States Patent
Karsijns et al.

(10) Patent No.: US 10,798,917 B2
(45) Date of Patent: Oct. 13, 2020

(54) FARM SYSTEM

(71) Applicant: N.V. Nederlandsche Apparatenfabriek NEDAP, Groenlo (NL)

(72) Inventors: Woltherus Karsijns, Groenlo (NL); Rudie Jan Hendrik Lammers, Groenlo (NL)

(73) Assignee: N.V. NEDERLANDSCHE APPARATENFABRIEK NEDAP, Groenlo (NL)

( * ) Notice: Subject to any disclaimer, the term of this patent is extended or adjusted under 35 U.S.C. 154(b) by 455 days.

(21) Appl. No.: 15/513,194

(22) PCT Filed: Oct. 2, 2015

(86) PCT No.: PCT/NL2015/050689
§ 371 (c)(1),
(2) Date: Mar. 22, 2017

(87) PCT Pub. No.: WO2016/053104
PCT Pub. Date: Apr. 7, 2016

(65) Prior Publication Data
US 2017/0303505 A1    Oct. 26, 2017

(30) Foreign Application Priority Data

Oct. 2, 2014  (NL) .................................... 2013560

(51) Int. Cl.
*A01K 11/00* (2006.01)
*A01K 29/00* (2006.01)
(Continued)

(52) U.S. Cl.
CPC ............ *A01K 11/006* (2013.01); *A01J 5/007* (2013.01); *A01J 7/00* (2013.01); *A01K 1/0017* (2013.01);
(Continued)

(58) Field of Classification Search
CPC .. A01K 11/006; A01K 11/008; A01K 11/001; A01K 1/12; A01K 11/0017; A01K 11/0023
See application file for complete search history.

(56) References Cited

U.S. PATENT DOCUMENTS

| 6,868,804 B1 * | 3/2005 | Huisma ................ A01K 11/006 119/51.02 |
| 2003/0154925 A1 * | 8/2003 | Van Den Berg ........ A01J 5/003 119/14.02 |

(Continued)

FOREIGN PATENT DOCUMENTS

| CA | 2862145 A1 * | 7/2013 | ................ A01K 1/12 |
| WO | WO-2012125264 A1 * | 9/2012 | ................ A01K 1/12 |

(Continued)

OTHER PUBLICATIONS

International Search Report, dated Feb. 26, 2016 (2 pages).
(Continued)

*Primary Examiner* — Kristen C Hayes
(74) *Attorney, Agent, or Firm* — Jacobson Holman PLLC

(57) ABSTRACT

A farm system comprising a plurality of smart tags which are each configured to be worn by an animal, a transmitter and receiver unit for wireless communication with the smart tag, one control unit which is communicatively connected to the transmitter and receiver unit and a farm unit which can be controlled by the control unit. Each smart tag comprises at least one sensor and is configured for wirelessly transmitting information obtained by one of the sensors to the transmitter and receiver unit, wherein the transmitter and receiver unit is configured for supplying the received information to the control unit and wherein the control unit is configured for processing the received information and, at least on the basis of this processed information, controlling at least a farm unit
(Continued)

and/or generating a report signal for indicating to a user of the system that an activity is to be carried out.

21 Claims, 1 Drawing Sheet

(51) Int. Cl.

| | | |
|---|---|---|
| *A01J 5/007* | (2006.01) | |
| *A01J 7/00* | (2006.01) | |
| *A01K 1/00* | (2006.01) | |
| *A01K 1/01* | (2006.01) | |
| *A01K 1/015* | (2006.01) | |
| *A01K 1/12* | (2006.01) | |
| *A01K 5/02* | (2006.01) | |
| *B25J 9/16* | (2006.01) | |
| *B25J 11/00* | (2006.01) | |

(52) U.S. Cl.
CPC .......... *A01K 1/0047* (2013.01); *A01K 1/0128* (2013.01); *A01K 1/0158* (2013.01); *A01K 1/12* (2013.01); *A01K 5/02* (2013.01); *A01K 29/005* (2013.01); *B25J 9/1697* (2013.01); *B25J 11/0045* (2013.01); *B25J 11/0085* (2013.01); *Y10S 901/41* (2013.01); *Y10S 901/47* (2013.01)

(56) References Cited

U.S. PATENT DOCUMENTS

| | | | | |
|---|---|---|---|---|
| 2004/0011294 | A1* | 1/2004 | Guo ................. | A01J 5/0175 119/14.02 |
| 2008/0314325 | A1* | 12/2008 | Hempstead ......... | A01K 11/004 119/51.02 |
| 2011/0308465 | A1* | 12/2011 | Siddell ............... | A01K 1/0029 119/14.03 |
| 2013/0036977 | A1* | 2/2013 | Kalnay ............... | A01K 5/02 119/51.02 |
| 2015/0282457 | A1* | 10/2015 | Yarden ............... | A01K 29/005 340/573.2 |

FOREIGN PATENT DOCUMENTS

| | | | | |
|---|---|---|---|---|
| WO | WO-2014030156 A1 * | 2/2014 | .......... | A01K 1/0029 |
| WO | WO-2015145422 A1 * | 10/2015 | .......... | A01J 5/007 |
| WO | WO-2016018162 A2 * | 2/2016 | .......... | A01K 5/0275 |
| WO | WO-2016032325 A1 * | 3/2016 | .......... | A01J 5/007 |
| WO | WO-2016039640 A1 * | 3/2016 | .......... | A61D 17/002 |

OTHER PUBLICATIONS

Trevarthen et al., "The RFID-Enabled Dairy Farm: Towards Total Farm Management", 7th International Conference on Mobile Business, 2008, XP031289095, pp. 241-250, cited in the ISR (10 pages).

"The SCR DataFlow II System", Jun. 23, 2014, XP055188469, <http://www.scrdairy.com/images/PDF/brochures_24_6/DFII_8_A4_Eng_Jul14J_low.pdf>, cited in the ISR (8 pages).

"Advanced Animal Management Systems GEA Milking & Cooling—WestfaliaSurge", Oct. 19, 2010, XP055188466, <http://www.westfalia.com/Images/7755-1000-012_US_CA_AnimalID_SortGate_091710_lores_tcm90-53206.pdf>, cited in the ISR, 8 pages).

Wang et al., "Wireless sensors in agriculture and food industry—Recent development and future perspective", Computers and Electronics in Agriculture, vol. 50, No. 1, Sep. 21, 2005, pp. 1-14,cited in the ISR (14 pages).

Foulkes et al., "Livestock Management System", Proceedings of the International Conference on Embedded Systems and Applications (ESA), Jan. 1, 2013, cited in the ISR (7 pages).

\* cited by examiner

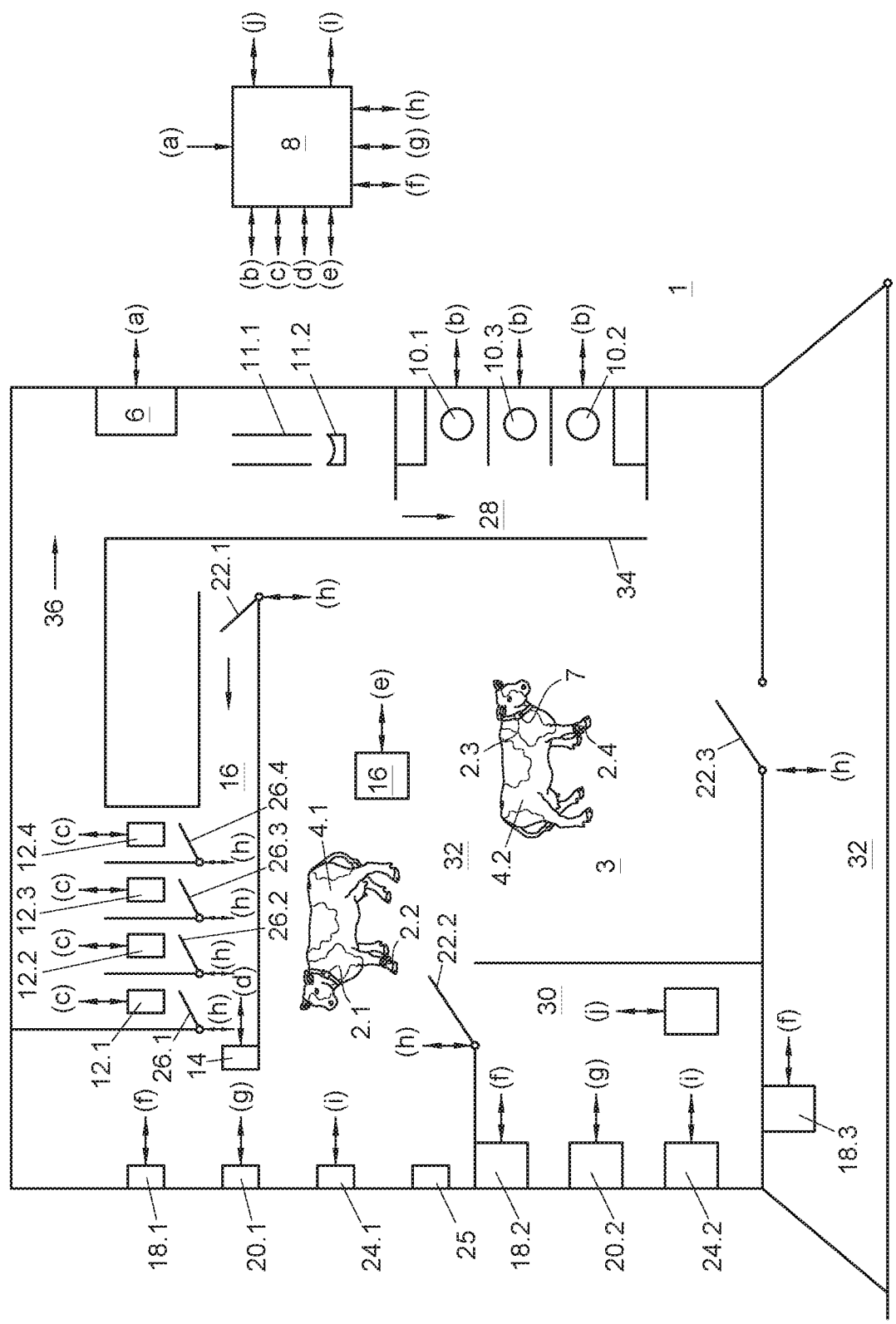

FARM SYSTEM

BACKGROUND OF THE INVENTION

The invention relates to a farm system according to the preamble of claim 1.

Such a farm system is known per se. In the known farm systems, various processes are already automated. These include, for instance, the milking of cows, feeding of cows, cleaning the stable, and routing and separating of cows. For such automation, typically, farm units are employed such as robots and/or other machines that perform their work automatically. These farm units are typically manually or time controlled. Manual control or time-control is usually done on the basis of input from a user. This user must then determine at what times and where the farm unit is activated.

In addition, it is possible to measure animal behavior with the aid of smart tags. The behavior that can be measured includes, inter alia: feeding, lying, standing, walking, activity, et cetera.

BRIEF SUMMARY OF THE INVENTION

The system according to the invention is characterized by the characterizing portion of claim 1.

According to the invention, it is therefore possible to use information that is obtained with the smart tags to control farm units in the stable. In particular, it holds here that the farm system is characterized by claim 2. Thus, information about the position of an animal can for instance be used to have a machine in a particular section of the stable carry out its activities or not. Also, it is possible with the smart tags to measure information about the behavior of the animal. Information about the behavior of an animal can then be used to have a machine carry out a specific activity. Information about behavior in combination with the position of an animal can be used to have a machine carry out a particular activity at a particular location.

In particular, it holds here that the system is configured for, on the basis of movements and/or positions of an animal registered with at least one smart tag, automatically determining an animal status such as an animal behavior such as feeding, lying, standing and activity or an animal status such as 'has fed'.

More particularly, it holds here that the control unit and/or the smart tag is configured for, at least on the basis of information obtained with at least one smart tag about movements and/or positions of an animal, automatically determining an animal status such as an animal behavior such as feeding, lying, standing and activity or an animal status such as 'has fed'.

Preferably, it holds here that the system, more particularly the control unit, is configured for switching a farm unit on and/or off, at least on the basis of information about a position of an animal obtained with at least one smart tag.

Preferably, it holds here that the control unit is configured for, at least on the basis of a determined animal status such as an animal behavior, controlling at least one of the farm units and/or providing management information. The control process according to the invention can hence comprise two steps. A first step comprises, on the basis of movements and/or positions of an animal registered with at least one smart tag, automatically determining an animal status such as an animal behavior such as feeding, lying, standing and activity, or an animal status such as 'has fed'. Thereupon, in a second step, on the basis of the determined animal status, at least one of the farm units can then be controlled. Such control can for instance comprise the starting or stopping of a farm unit. If the farm unit is for instance a robot for cleaning the stable, control can also relate to having a particular part of the stable cleaned by the cleaning robot. This can then be parts of the stable where the animals are not present or, specifically, parts of the stable where the animals are present because that's where the stable is filthy. Depending on the behavior of an animal as determined by the control unit, control can also, besides comprising starting and stopping, relate to the amount of feed that is given to the animal concerned by a feeding unit.

In particular, it holds that the system, more particularly, the control unit, is configured for, at least on the basis of information which has been received from at least one smart tag, selecting at least one farm unit for control by the control unit, more particularly, selecting an activity that needs to be carried out and accordingly controlling a farm unit for carrying out the selected activity. For instance, when the animals are in a cow lying box, an activity for other parts of the stable can be activated for cleaning the stable with the aid of a cleaning robot. Further, as the animals are in a cow box, a farm unit in the form of a heating unit can be started for heating the cow box. For other parts of the stable where the animals are not present, a heating unit can be switched off or turned down. Besides heating units, also lights can be switched on or off, depending on where the animals are present. Moreover, partly based on the time of day, lamps can then also be dimmed to a greater or lesser extent, depending on the status of at least one animal as determined with the aid of at least one smart tag. Such dimming can hence also be executed depending on the presence of animals. Selecting a farm unit therefore means that the farm system comprises a set of farm units comprising at least two, in particular at least three, farm units at least one of which can be selected to be controlled by the control unit. The set can comprise the same type of farm units, such as the heating units. Also, the set may comprise different types of farm units, such as the heating unit and the cleaning robot. It follows, therefore, that the farm system can comprise a set of farm units comprising two, in particular at least three, farm units, while in particular the set comprises mutually different types of farm units as mentioned in claim 1 (feeding unit, milking unit, dung scraper, dung robot, controllable gate, lighting unit, cooling unit, heating unit, ventilation unit, distribution unit). In particular, the smart tag as described above is used to determine a status of the animal such as standing, lying, walking, feeding, or having fed. The smart tag, besides comprising a movement sensor which can be used for determining this status, can also comprise other sensors. For instance, the smart tag may also comprise a temperature sensor. This temperature sensor may for instance be used to determine a temperature of the surroundings. On the basis thereof, the control unit can for instance control a farm unit in the form of a heating element, for instance for additionally heating a space where the respective animal is present or for less additional heating. Also, in this manner, a cooling unit or a ventilation unit and the like can be operated for cooling a space where an animal concerned is present. The temperature sensor can also be used, however, to measure the temperature of the animal itself. Depending on this, also farm units such as a camera may be activated to watch the animal remotely when the measured temperature of the animal falls outside a defined range. The smart tag can also be provided with an atmospheric pressure sensor and/or a humidity sensor. The information obtained with the atmospheric pressure sensor and the humidity sensor can also be supplied to the control unit whereupon the control unit, at least in response to this information, can activate a farm unit such as a cooling or heating unit. It is also conceivable that windows and/or doors/vents are opened or closed by the control unit in response to a measured atmospheric pressure and/or air humidity. Also, the smart tag may be provided with an optical sensor. This optical sensor can for instance consist of a camera providing images of the surroundings of the animal from the animal's perspective. These images can be supplied to a control unit for further processing. Thus, it is conceivable, for instance, that on the basis of these images, other animals are recognized so that control can take place in response to the presence of a group of animals. Precisely when each of the animals is provided with such a smart tag, this combination can provide a proper image of how a group of animals behave. In response, the control unit can control farm units, for instance a dung robot which can move through the farm and then avoid a group of animals. Also, in this manner, it can be verified whether a group is calm or that the group is panicky. In response, particular gates may be opened to give a group of animals room to move to a different location on the farm. Such variants are also part of the invention.

Furthermore, it is possible, on the basis of information which is obtained by the control unit from at least one smart tag, to provide management information. A dairy farmer's animal management is of great influence on the technical results he can achieve. With good technical results, a farmer achieves a better financial return. In current practice, especially direct parameters are measured that reflect the technical results of the business. These are, for instance, the milk yield of the animals and the concentrate dosages. With the aid of information about animal behavior measured with the smart tag, it is possible, for instance, to indicate that and/or how the animal management of a (dairy) farmer can be improved. Improving management results in better technical results. By determining a behavior of an animal or of a group of animals with the aid of the smart tags, and with the aid of the control unit, management information can be obtained on the basis thereof.

BRIEF DESCRIPTION OF THE DRAWINGS

The invention will be further elucidated on the of the drawing. In the drawing:

FIG. 1 schematically shows a farm system according to the invention.

DETAILED DESCRIPTION OF THE INVENTION

In FIG. 1, with reference numeral 1, a farm system according to the invention is denoted. The farm system comprises a plurality of smart tags 2.$i$ (i=1, 2, 3 . . . n). In this example, a smart tag 2.1 is attached to the neck of an animal 4.1. Further, a smart tag 2.3 is attached to the neck of an animal 4.2. However, the system may further comprise other animals which are each provided with such a smart tag. Instead of a smart tag 2.1, or in addition to the smart tag 2.1, the animal 4.1 may further be provided with a smart tag 2.2 which is attached to a leg of the animal and/or a smart tag which is attached to a tail of the animal. Likewise, in addition to the smart tag 2.3 or instead of the smart tag 2.3, the animal 4.2 may further be provided with a smart tag 2.4 which is attached to a leg of the animal 4.2 and/or a smart tag which is attached to a tail of the animal. The system further comprises at least one transmitter and receiver unit 6 for wirelessly communicating with the smart tags 2.$i$. The smart tag 2.$i$ can be of a type known per se which is configured for determining positions (location), orientation and/or movements of the animal. For this, the smart tag can comprise a movement sensor known per se. The position of a smart tag can be determined in a manner known per se. The smart tag can communicate with the transmitter and receiver unit by means of, for instance, radio waves. To this end, the smart tag can comprise a transmitter and receiver unit which comprises a processor to which the respective sensors are coupled and a supply unit. Also, conceivably, the smart tag comprises an RFID circuit and the respective sensors connected with the RFID circuit. The transmitter and receiver unit 6 is then configured to determine a position of a smart tag on the basis of a response of the smart tag to an electromagnetic field transmitted by the transmitter and receiver unit. This response may consist in modulation of the transmitted RFID field, or transmission of a return signal to the transmitter and receiver unit. From the lapse of time between a transmission by the transmitter and receiver unit 6 and reception by the transmitter and receiver unit 6, a distance from the smart tag to the transmitter and receiver unit can be calculated. As stated, the position of a smart tag can be determined in a manner known per se, for instance in that the transmitter and receiver unit 6 comprises a phased array antenna with which the direction of a received signal can be determined. A same method can be used with an active smart tag which transmits a signal in response to a received signal coming from the transmitter and receiver unit 6. Other methods are also conceivable, such as the smart tag receiving a signal strength from beacons that generate a signal and are suspended at fixed positions in the stable.

In this example, it is assumed that the smart tag is at least provided with a sensor 7 such as a movement sensor. This is not requisite. The smart tag may also be provided with other sensors 7, or in addition to the movement sensor be provided with other sensors 7, such as a temperature sensor for measuring an ambient and/or body temperature of the animal, an optical sensor such as a video camera for obtaining an image of surroundings of the animal, an optical sensor in the form of, for instance, a light sensor for obtaining information about the amount of light at a position where the animal is present, a humidity sensor to determine the air humidity in a place where the animal is present, an atmospheric pressure sensor to determine the atmospheric pressure in a place where the animal is present, a microphone to detect sound, et cetera.

The system further comprises a control unit 8 which via a communication link (a), such as a line, is communicatively connected to the transmitter and receiver unit 6. Furthermore, the farm comprises a number of farm units which are each connected with the control unit 8 via communication channels (b), (c), (d), (e), (f), (g), (h), (i). Thus, the system comprises three feeding machines 10.1, 10.2, 10.3 which are each connected to the control unit 8 via a communication channel (b). Furthermore, the system comprises at least one feeding gate/feeding path 11.1 where an automatic dosing system 11.2 can dose out feed. The system furthermore comprises four milking robots 12.1-12.4 which are ach connected with the control unit via a communication channel (c). Furthermore, the system comprises a dung scraper 14 for scraping dung and urine into a passage 16. The dung scraper 14 is communicatively connected with the control unit 8 via a communication channel (d). Furthermore, the system comprises a cleaning robot 16 for cleaning the stable. The cleaning robot 16 is connected with the control unit 8 via a communication channel (e). The system further comprises three lighting units 18.1-18.3 which are each connected with the control unit 8 via a communication channel (f). Also, the system comprises a number of heating units 20.1 and 20.2 which are each connected with the control unit 8 via a communication channel (g). Furthermore, the farm system comprises a number of controllable gates or doors 22.1-22.3 which are each connected with the control unit 8 via a communication channel (h). The farming units furthermore comprise two cooling devices 24.1 and 24.2 which are each communicatively connected with the control unit 8 via a communication channel (i). The farm system comprises, as can be seen in the drawing, a passage 16 which is accessible to the animals when a gate 22.1 is opened. This passage gives access to the four milking robots 12.1-12.4. In this example, each milking robot is separately accessible through a gate 26.1-26.4. Each gate is of controllable design and is also connected with the control unit 8 via the communication channel (h). The farming system comprises furthermore a passage 28 which gives access to the feeding units 10.1-10.3. Also, the farm system comprises a separate cow box 30 which is accessible via the gate 22.2. In the cow box, the animals can lie undisturbed. The farm system also comprises a meadow 32, the meadow 32 and the stable 3 being connected with each other via the controllable door 22.3. The system further comprises a distribution unit 31 for automatically providing the bedding area of an animal with a layer of material such as straw. The distribution unit is connected with the control unit 8 via the communication channel (j). In use, the farm system described so far operates as follows.

With the aid of the smart tag 2.1 and 2.3, information about the movements and positions of the animals 4.1 and 4.2 is obtained. This information is wirelessly supplied to the transmitter and receiver unit 6. The transmitter and receiver unit transmits this information to the control unit 8 via the communication channel (a). The transmitter and receiver unit also transmits information to the control unit 8 via the communication channel (a) about the position of the smart tags 2.1 and 2.3. The control unit 8 is configured for, on the basis of at least the information obtained about the movements and/or positions of the animal, automatically determining an animal status, for instance an animal behavior such as ruminating, feeding, lying, standing, walking, defecating, urinating and/or activity. Or an animal status such as "has fed" and/or the current location of the animal. All this can be carried out in a manner known per se. Suppose the smart tag is attached to the neck of the animal. When, for instance, the animal is standing, this will become apparent from a specific orientation of the smart tag. When the animal is lying down, this will also be apparent from a specific orientation of the smart tag. When the animal is feeding, this is also reflected by a particular orientation of the smart tag. This is, moreover, accompanied by a known movement of the smart tag. When the animal is walking, this is also accompanied by a specific orientation and specific movements of the smart tag. This also holds true for an activity of the animal. The status of the animal having fed can also be determined, for instance based on the fact that with the smart tag, a position of the animal has been determined that corresponds to the position of one of the feeding machines 10.1-10.3 and/or the feeding gate and/or the automatic dosing system 11.2. When in addition, by the orientation unit, an orientation and movements of the smart tag have been measured corresponding to an expected orientation and movements when feeding, it can be determined by the control unit that the animal is feeding and thus, a while later, that the animal has fed. As stated, the smart tag 2.*i* can also be attached to other parts of the animal, such as a leg or a tail. With the smart tag attached to the leg, animal behavior such as walking can be detected well. With the smart tag attached to the tail, an animal behavior such as defecating can be detected well. Naturally, an animal can also be provided with more than one smart tag, for instance one fitted to the neck and one to the tail and/or the leg. The control unit is configured to control at least one of the farm units mentioned based on the information received from the tags.

More particularly, it holds that the control unit is configured for automatically determining an animal status at least on the basis of information obtained by the smart tags about movements and/or positions of the animal, while thereupon, based on the determined animal status, at least one of the farm units is controlled. For instance, the dung scraper 14 can be activated when the control unit measures that no animals are present in the passage 16. When the animals 4.1 and 4.2 are in the cow box 30, and this is determined by the control unit 8 with the aid of the smart tags 2.1 and 2.3, the control unit 8 can switch the cleaning robot 16 on for cleaning the area 32 of the stable 3 which is outside the cow box 30. Also, the distribution unit can be activated by the control unit when it is determined that bedding areas are not or insufficiently utilized (for instance: the lying time per animal is too short) and/or that no animals are present at any bedding place in the cow box. Such bedding place can then be automatically provided by means of the distribution unit with a layer of material, such as straw. The distribution unit can also be activated by the control unit when it is determined that no animals are present in the cow box. The cow box can then be automatically provided with a layer of material such as straw by means of the distribution unit. When, for instance, the animal 4.1 is currently present in the stable area 32 of the stable 3, the control unit 8 can control the cleaning robot such that it avoids the animal 4.1. Then, the cleaning robot 16 can proceed to clean the stable via defined routes. When it is measured with the aid of the smart tags that the animals are not in the cow box 30, the control unit 8 can control the cleaning robot 16 such that it proceeds to clean the cow box 30. When the animals are behind the feeding fence 34, the control unit 8 will control the dung robot 16 such that it will not go near the feeding fence 34, in order to avoid unrest among the animals.

As has been clarified in the example above, it is possible that at least on the basis of processed information that is obtained from a smart tag, a farm unit is controlled. This information can for instance relate to the position of the animal. The position of the animal then determines, for instance, where the dung robot can move to. As appears from the example, however, it is also possible that the control unit on the basis of the information from the smart tag first determines an animal status in an automatic manner. Such animal status can be determined on the basis of movement and/or positions of the animal that have been established with the aid of the smart tag. Then, in a second step, on the basis of a determined animal status, at least one of the farm units can be controlled. Control of a farm unit may also in part be based on other information, for instance be based on the time of day. For instance, during the night, the control unit must not activate the dung robot. During the day, on the other hand, the control unit can activate the dung robot, on the basis of the animal status. Also the feeding machines 10.1-10.3 and the dosing system 11.2 can be operated by the control unit at least on the basis of information obtained with the aid of the smart tags. The animals can for instance move into the meadow 32. When the animals graze, the amount of grass they consume in the meadow influences the amount of feed they can consume in the stable. The amount of grass the animals consume in the meadow strongly depends on the weather, grass height and grass quality. If the animals consume less grass in the meadow, this means that this grass deficit needs to be made up for by other products in the stable. In addition, the time at which the feed is available is relevant. In principle, the animals must continuously have sufficient feed available to them. With the aid of the smart tags, the extent to which the animals feed can be measured by the control unit. This information is thereupon used to drive the feeding machines. When the control unit has determined the amount of grass the animals have consumed, the control unit can adjust the amount of feed the respective animal receives at the feeding machine accordingly. It is also possible that the control unit starts a feeding machine when the animal is in the proximity of the feeding machine, which is measured by means of the smart tags and when the control unit has determined by means of the smart tag attached to the respective animal that the animal has not eaten for a given time.

The present farm system also provides for controlled animal traffic. This means that an animal must move through the stable according to a predetermined route in order to fill all its needs. The stable may for instance be designed such that in order to get to the feeding machines 1.0.1-10.3, the animal must first pass via the passage 16 to one of the milking robots 12.1-12.4 in order to be milked. To promote the predetermined route, the control unit can take the behavior of the animal into account. If, for instance, it is established that the animal has not fed for quite some time, the gate 22.1, when the animal gets there, can be opened automatically under the control of the control unit. Then, the animal walks towards the milking robots. When, for instance, the milking robot 12.4 is in use, the control unit can ensure the gate 26.4 is closed. When the milking robot 12.3 is free, the control unit ensures the gate 26.3 is opened. The animal will then move to the milking robot 12.3 in order to be milked. Then, the animal can move via a passage 36 to the feeding machines 10.1-10.3. When the animal presents at one of the feeding machines, the presence of the animal is recognized by means of the smart tag and this is passed on to the control unit 8. Then the control unit 8 controls the respective feeding machine, for instance the feeding machine 10.1, to feed a predetermined amount of portion feed to the animal. After feeding, the animal can return to the stable area 3.

In the foregoing, the animal status was determined by the control unit based on information received from a smart tag. It is also possible, however, that the smart tag is an 'intelligent' smart tag and, if so, itself determines on the basis of detected movements of the animal an animal status such as feeding, lying, standing and activity or an animal status such as 'has fed'. The smart tag can supply this information, for instance in combination with a time label indicating the time and/or period of time to which the respective information relates, via the transmitter and receiver unit 6 to the control unit 8. The control unit 8 can then process this information for controlling the farm units, all this as discussed hereinabove.

In this example, it further holds that the control unit is configured for processing in combination information received from a plurality of smart tags and for controlling at least on the basis of the information processed in combination at least one farm unit. When, for instance, a large number of animals present themselves at the gate 22.3, which indicates that the animals may be restless and want to graze in the meadow, this can be established by the control unit whereupon the control unit controls the gate via the information channel (h) and opens it. Also when it appears that a large number of animals move vehemently, this can be thus established by the control unit 8. Then, the control unit can, for instance, activate the lighting units 18.1 and 18.2 when it is dark, so that the animals quiet down and it can be checked what is the matter with the animals. Also, with the aid of a microphone in the smart tag, unusual sounds in the vicinity of the smart tag can be detected that make the animals restless and/or that indicate that there's something the matter with the animals or near them. Such sounds may be caused by the animal wearing the smart tag or by other animals, or by other sources such as, for instance, a feeding machine which is noisy because it is jamming. The control unit can then generate an alarm. Also when it is measured with a number of smart tags spread over the stable that the temperature measured by each of the smart tags is high, which indicates that a relatively high temperature is measured at multiple different locations in the stable, and that the temperature in the whole of the stable is too high, the control unit may, for instance, start the cooling units 24.1 and 24.2 and/or activate a ventilation unit 25. The ventilation unit can consist of a valve which can be opened and closed for passive ventilation but can also comprise an active fan. Entirely analogously, it may be so that, when it's measured with a plurality of smart tags that the ambient temperature is relatively low, the control unit 8 in response, for instance, activates the heating units 20.1 and 20.2 or controls them such that they give off more heat than before. Naturally, controlling a heating unit 20.$i$ or a cooling unit 24.$i$ can also be done in response to a temperature which has been measured with the aid of a single smart tag. When, for instance, only one animal is in the cow box 30 while the smart tag measures that the temperature in the cow box is relatively high or relatively low, the control unit can choose to activate the cooling unit 24.2 or the heating unit 20.2, respectively. Also, a smart tag can comprise an optical sensor, e.g., a light sensor. With a light sensor, the amount of light in surroundings of the animal can be determined. If this amount of light is relatively low, while, for instance, also an activity of the animal such as walking is determined, for instance when the animal is in the meadow, the control unit can start the lighting unit 18.3. If the animal is in the cow box 30, then the control unit can start the lighting unit 18.2. The foregoing goes to show that, depending on a combination of a status of an animal and another measurement carried out by a smart tag, such as a temperature measurement or a light measurement, the control unit can select a particular farm unit for carrying out a particular operation. It also holds that, depending on a determined animal status, just one particular farm unit can be selected. When the animal status is, for instance, 'has not yet fed', then, a feeding machine can be activated. If the animal status is 'animal walking towards the gate 22', then the gate 22 can be opened so that the animal can be milked. Such variants each fall within the scope of the invention. In this example, the control unit is also configured for determining, at least on the basis of information of a plurality of smart tags, the behavior of a herd or herding behavior of animals and controlling, at least on the basis of the herd behavior and/or herding behavior, at least one farm unit. This has already been explained hereinabove on the basis of a number of examples, where, for instance, animals were collectively restless whereupon a specific gate can be opened or a lighting unit can be activated et cetera. The control unit is also configured for comparing at least one determined status that has been determined by the control unit or by the smart tag itself, of at least one animal, with a reference status for assessing animal management relating to the animal. The control unit is also configured for comparing a plurality of such statuses of a plurality of animals with a reference status for assessing animal management relating to the animals. A practical application of this relates to the transition period. With dairy cows, the transition period is understood to mean the period marking the transition of a dry cow (non-milked animal) to a fresh cow (having recently calved and lactating). This period is characterized by great metabolic change within the cow. It is also a stressful period. With the smart tags the behavior of the animals can be measured and, based on a measured group/herding behavior, animal management can be assessed.

By comparing animal behavior with an optimum standard, deviations can be brought to light. In this manner, a dairy farmer can be shown that the dry cows are not fed properly, with the result that already before calving, the animal is not in an optimal condition and will have a poor startup.

Another example is claw health. In dairy farming, claw health is mainly determined by the dairy farmer's animal management. Feed, cleaning of stables, and claw care influence claw health on a dairy farm. The systems for measuring claw health range from manual scoring methods to automatically measuring the claw score of an animal. These methods always give results when the harm, if any, has already been done. With a system according to the invention, by using the information of the smart tag about the behavior of animals, a pronouncement can be made on the current state of affairs regarding claw health. Such analysis can be carried out by the control unit. There is also the possibility, however, of making pronouncements on animal management affairs that influence claw health on the farm. A dairy farmer can thus make adjustments much sooner in order to prevent problems.

It is noted that in this example, the smart tag 2.1 was used to monitor the behavior of the animal 4.1. However, the behavior of ruminating, feeding, lying, standing, walking, defecating, urinating and/or activity, et cetera, can also be determined with the aid of the smart tag 2.2 of the animal. This also holds for the smart tag 2.4 in respect of the animal 4.2. Accordingly, it holds in particular that, practically, the information of both smart tags of the animal is used. This is not necessarily so, however. The smart tag can also have other sensors such as a camera. In this manner, camera images can be defined from the position of the animal. The smart tags or the control unit are able to analyze surroundings of the animal, for instance, for the presence of other animals. When other animals are present, a smart tag can pass this on to the control unit. The control unit which receives the overview from each of the smart tags can draw conclusions based on all this information. The transmitter and receiver unit can consist of a single integrated unit or a separate transmitter unit and a separate receiver unit. The transmitter and receiver unit can also be provided with control means for controlling the transmitter and receiver unit and for signal processing. In the foregoing examples, it has been explained that the control unit is configured for processing the received information and, at least on the basis of this processed information, controlling at least one of the farm units. It is also possible that the control unit, instead of or in addition to controlling a farm system, generates a report signal to indicate to a user that an activity is to be carried out, possibly together with information about what activity is to be carried out. The report signal may hence comprise just an alert for the user that something needs to be done but also information about the activity to be carried out. If the report signal is just an alert, a user can see, for instance on a display communicatively coupled to the control unit, what kind of activities are to be carried out. The system may be configured for, in response to the alert, generating a signal which can be directly perceived by a user, such as a light or audio signal. These latter signals can be just alerts and/or also comprise information for the user about the nature of the activities to be carried out. The system may also be so configured as to, in use, supply the alert to a device of the user, such as a computer, a tablet or mobile phone. In all of these instances, the report signal can, once again, comprise just an alert and/or also information about the nature of the activities to be carried out. This alert and/or this information can then be perceived by the user via the device of the user. For instance, the control unit and/or the smart tag can determine in relation to a number of animals an animal status meaning that they are no longer grazing in a meadow. This animal status can then also comprise the current position of the number of animals. The indicated activity to which the report signal relates can then comprise, for instance, the user having to put up a wire and/or install a fence or close off a passage so that a part of the meadow is no longer accessible to these animals. The effect is that this part of the meadow is not partly grazed by the animals. The animals then first have to graze the part of the meadow they are in, but where they are no longer grazing because, apparently, they have fed sufficiently for the moment. This results in more efficient grazing of a meadow. It is hence possible that the user, in response to the report signal, closes off a part of a meadow for animals and/or that the user, in response to the report signal, opens up a part of the meadow for the animals.

Such variants also fall within the scope of protection of the present invention.

The invention claimed is:

1. A farm system comprising a plurality of smart tags which are each configured to be worn by an animal, at least a transmitter and receiver unit for wireless communication with the smart tags, at least a control unit which is communicatively connected with the transmitter and receiver unit, and at least one farm unit, wherein the at least one farm unit comprises at least one of the following farm units: a feeding unit for feeding the animals under the control of the control unit, a milking unit for milking the animals under the control of the control unit, a dung scraper for shoving off dung and/or urine on a floor under the control of the control unit, a dung robot which is automotive for cleaning a stable following a particular route under the control of the control unit, a controllable gate for opening or closing, under the control of the control unit, an access to an area of a farm and a passage of a farm, a lighting unit for lighting, under the control of the control unit, at least one area of a farm or meadow, a cooling unit for cooling, under the control of the control unit, at least one area of the farm, a distribution unit for automatically providing at least one bedding area for an animal with a layer of material and/or a heating unit for heating, under the control of the control unit, at least one area of the farm, a ventilation unit for ventilating at least one area of the farm, wherein it further holds that each of the smart tags comprises at least one sensor and wherein each smart tag wirelessly passes on information which has been obtained with at least one of the sensors, to the transmitter and receiver unit, wherein the transmitter and receiver unit supplies the received information to the control unit and wherein the control unit processes the received information and, at least on the basis of this processed information, controls at least one of the farm units and/or generates a report signal to indicate at a user of the system that an activity is to be carried out, wherein the control unit, at least on the basis of information received from at least one smart tag, selects the at least one of the farm units for control by the control unit, and selects an activity which is to be carried out, and accordingly controls the at least one of the farm units for carrying out the selected activity, wherein the farm system is provided with a set of farm units comprising at least two farm units, and wherein the set comprises mutually different types of farm units.

2. The farm system according to claim 1, wherein the system determines a position of each of the smart tags.

3. The farm system according to claim 2, wherein the control unit and/or the smart tag automatically determines, at least on the basis of information obtained with at least one smart tag about movements and/or positions of an animal, an animal behavior of the animal or an animal status or a current position of the animal.

4. The farm system according to claim 3, wherein the control unit, at least on the basis of a determined animal status or animal behavior, controls one of the farm units and/or provides management information.

5. The farm system according to claim 2, wherein the control unit switches a farm unit on and/or off, at least on the basis of information about a position of an animal obtained with at least one smart tag.

6. The farm system according to claim 5, wherein the system, at least on the basis of movements and/or positions of an animal registered with at least one smart tag, automatically determines an animal behavior, or an animal status or a current position of the animal, and wherein the control unit further, at least on the basis of an animal status determined by the system, selects the at least one of the farm units for control by the control unit, selects an activity which is to be carried out and accordingly controls the at least one of the farm units for carrying out the selected activity, wherein the farm system comprises a set of farm units comprising at least two farm units, wherein the set comprises mutually different types of farm units.

7. The farm system according to claim 1, the system automatically determines, at least on the basis of movements and/or positions of an animal registered with at least one smart tag, an animal behavior of the animal or an animal status or a current position of the animal.

8. The farm system according to claim 1, wherein the control unit, at least on the basis of information which has been received from at least one smart tag, selects an activity which is to be carried out at a particular position and accordingly controls a farm unit for carrying out the selected activity at the particular position.

9. The farm system according to claim 8, wherein, the system, at least on the basis of movements and/or positions of an animal registered with at least one smart tag, automatically determines an animal behavior or an animal status or a current position of the animal and wherein the control unit further, at least on the basis of an animal status determined by the system in combination with a position of the animal determined by the system, selects an activity which is to be carried out at a determined position and accordingly controls a farm unit for carrying out the selected activity at the determined position, wherein the farm system comprises a set of farm units comprising at least two farm units wherein the set comprises mutually different types of farm units.

10. The farm system according to claim 1, wherein the control unit, at least on the basis of information that has been received from at least one of the smart tags, determines the animal status which is a measure of at least the amount of feed which at least one animal has eaten and the control unit controls at least one feeding unit at least on the basis of the determined amount that at least one animal has eaten.

11. The farm system according to claim 1, wherein the control unit, at least on the basis of information that has been received from at least one smart tag about the position of at least one animal, controls at least one stable cleaning robot for selectively cleaning defined parts of a stable in the farm.

12. The farm system according to claim 1, wherein the control unit, at least on the basis of information which has been received from at least one smart tag about the position of at least one animal, controls at least one feeding machine for selectively feeding at least one animal.

13. The farm system according to claim 1, wherein the control unit, at least on the basis of information which has been received from at least one smart tag about the position of at least one animal, controls at least one milking robot for selectively milking at least one animal.

14. The farm system according to claim 1, wherein the control unit processes in combination information which has been received from the plurality of smart tags and controls the at least one farm unit at least on the basis of the information processed in combination.

15. The farm system according to claim 14, wherein the control unit processes, at least on the basis of the information from the plurality of smart tags, determines the behavior of a herd or herding behavior of animals and, at least on the basis of the behavior of a herd or herding behavior, controlling the at least one of the farm units.

16. The farm system according to claim 1, wherein the control unit compares at least one determined status of at least one animal with a reference status for assessing animal management in respect of this animal and/or sends a notification that a status of the animal falls outside a reference status.

17. The farm system according to claim 16, wherein the control unit, at least on the basis of the comparison, provides information about a transition period of at least one animal and/or a claw health of at least one animal.

18. The farm system according to claim 17, wherein the system, in response to the report signal, generates a light or audio signal which can be perceived directly by a user, or wherein the system supplies the report signal to a device of the user, selected from a computer, tablet or mobile phone.

19. The farm system according to claim 1, wherein the control unit compares a plurality of statuses of a respective plurality of animals with a reference status for assessing an animal management in respect of the animals.

20. The farm system according to claim 1, wherein the area of the farm is a stable, a part of the stable, a cow box, a feeding area of a stable and a meadow; wherein the layer of material is straw; and wherein the at least one sensor is a movement sensor, temperature sensor, optical sensor, atmospheric pressure sensor, moisture sensor, microphone or a sensor for determining a distance to an object.

21. A method of operating a farm system, the farm system comprising a plurality of smart tags which are each configured to be worn by an animal, at least a transmitter and receiver unit for wireless communication with the smart tags, at least a control unit which is communicatively connected with the transmitter and receiver unit, and at least one farm unit, wherein the at least one farm unit comprises at least one of the following farm units: a feeding unit for feeding the animals under the control of the control unit, a milking unit for milking the animals under the control of the control unit, a dung scraper for shoving off dung and/or urine on a floor under the control of the control unit, a dung robot which is automotive for cleaning a stable following a particular route under the control of the control unit, a controllable gate for opening or closing, under the control of the control unit, an access to an area of a farm and a passage of a farm, a lighting unit for lighting, under the control of the control unit, at least one area of a farm or meadow, a cooling unit for cooling, under the control of the control unit, at least one area of the farm, a distribution unit for automatically providing at least one bedding area for an animal with a layer of material and/or a heating unit for heating, under the control of the control unit, at least one area of the farm, a ventilation unit for ventilating at least one area of the farm, wherein each of the smart tags comprises at least one sensor, and wherein the method comprising the steps of:

wirelessly receiving, by the transmitter and receiver unit, from each of the smart tags, information which has been obtained with at least one of the sensors;

supplying, by the transmitter and receiver unit, the received information to the control unit;

processing the received information by the control unit, and at least one of:

controlling, by the control unit, at least on the basis of the processed information, at least one of the farm units; or generating, by the control unit, a report signal to indicate at a user of the system that an activity is to be carried out;

wherein the method further comprises the steps of:

selecting, by the control unit, at least on the basis of information received from at least one smart tag, the at least one of the farm units for control by the control unit;

selecting, by the control unit, an activity which is to be carried out; and accordingly controlling, by the control unit, the at least one of the farm units for carrying out the selected activity;

wherein the farm system is provided with a set of farm units comprising at least two farm units, and wherein the set comprises mutually different types of farm units.

\* \* \* \* \*